US009459486B2

(12) United States Patent
Yamakawa et al.

(10) Patent No.: US 9,459,486 B2
(45) Date of Patent: Oct. 4, 2016

(54) LIQUID CRYSTAL DISPLAY DEVICE IN WHICH DISPLAY OF OFF STATE REFLECTED LIGHT IS SUPPRESSED

(71) Applicant: Japan Display Inc., Minato-ku (JP)

(72) Inventors: Eishi Yamakawa, Tokyo (JP); Junichi Kobayashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 36 days.

(21) Appl. No.: 14/539,369

(22) Filed: Nov. 12, 2014

(65) Prior Publication Data

US 2015/0131015 A1      May 14, 2015

(30) Foreign Application Priority Data

Nov. 14, 2013   (JP) ................. 2013-235596

(51) Int. Cl.
*G02F 1/1335*      (2006.01)
*G02F 1/1333*      (2006.01)
*G02F 1/1343*      (2006.01)
*G02F 1/136*       (2006.01)

(52) U.S. Cl.
CPC ... *G02F 1/133512* (2013.01); *G02F 1/133514* (2013.01); *G02F 2001/134372* (2013.01)

(58) Field of Classification Search
CPC ............... G02F 1/133514; G02F 1/133512; G02F 1/133516; G02F 1/133555; G02F 1/134363; G02F 1/133707; G02F 1/136213; G02F 1/136209; G02F 2001/133388; G02F 1/136227; G02B 5/201

USPC .................................. 349/106, 44, 110, 141
See application file for complete search history.

(56) References Cited

U.S. PATENT DOCUMENTS

2004/0095521 A1*  5/2004  Song .................. G02F 1/133514
                                                                349/61
2015/0124204 A1*  5/2015  Ryu ................... G02F 1/133516
                                                                349/106

FOREIGN PATENT DOCUMENTS

JP        2011-13387       1/2011
WO    WO 2013/108783 A1    7/2013

* cited by examiner

*Primary Examiner* — Mike Qi
(74) *Attorney, Agent, or Firm* — Oblon, McClelland, Maier & Neustadt, L.L.P (57) ABSTRACT

According to one embodiment, a liquid crystal display includes a first substrate, a second substrate including a first color filter, located in an area corresponding to first to fourth color pixels, and having an aperture in an area including the second and third color pixels, a second color filter located in an area corresponding to the second color pixel, a third color filter located in an area corresponding to the third color pixel, and a black matrix extending and partitioning the first to fourth color pixels, and a liquid crystal layer held between the substrates. The black matrix includes portions extending on the first color filter, and portions extending on the first color filter between the first and second color pixels and between the third and fourth color pixels.

16 Claims, 9 Drawing Sheets

LIQUID CRYSTAL DISPLAY DEVICE IN WHICH DISPLAY OF OFF STATE REFLECTED LIGHT IS SUPPRESSED

CROSS-REFERENCE TO RELATED APPLICATIONS

This application is based upon and claims the benefit of priority from Japanese Patent Application No. 2013-235596, filed Nov. 14, 2013, the entire contents of which are incorporated herein by reference.

FIELD

Embodiments described herein relate generally to a liquid crystal display device.

BACKGROUND

Liquid crystal display devices are used as display devices in various industrial fields. In recent years, there is an increasing demand for a technique of suppressing colors of reflected light when external light has entered a liquid crystal display device that is in the off state and displays no images.

On the other hand, a technique is known in which a fine uneven structure including a large number of small projections is formed on the surface of a black matrix layer to reduce the reflectance of the black matrix layer.

DETAILED DESCRIPTION

In general, according to one embodiment, a liquid crystal display device comprising: a first substrate including pixel electrodes corresponding to a first color pixel, a second color pixel, a third color pixel and a fourth color pixel arranged in an order mentioned along a first axis; a second substrate including a first color filter, a second color filter, a third color filter, and a black matrix layer, the first color filter extending along the first axis and along a second axis perpendicular to the first axis, the first color filter located in an area corresponding to the first to fourth color pixels, and having an aperture formed in an area including the second and third color pixels, the second color filter located in the aperture in an area corresponding to the second color pixel, the third color filter located in the aperture in an area corresponding to the third color pixel, the black matrix layer extending along the first and second axes and partitioning the first to fourth color pixels; and a liquid crystal layer held between the first and second substrates, wherein the black matrix layer includes portions extending on the first color filter along the first axis, and portions extending on the first color filter along the second axis between the first and second color pixels and between the third and fourth color pixels.

Embodiments will be described with reference to the accompanying drawings. It should be noted that the disclosures herein are merely examples, and that modifications of the invention, which can be easily conceived without departing from the scope thereof, should be, of course, included in the scope of the invention. Further, the drawings may more schematically show the width, thickness, shape, etc., of each element than in the embodiments. However, the shown elements are merely examples and do not limit the interpretation of the invention. Yet further, in the embodiments and drawings, like reference numbers denote like elements having the same or similar functions, and duplication of detailed description may be avoided.

Figure 1:
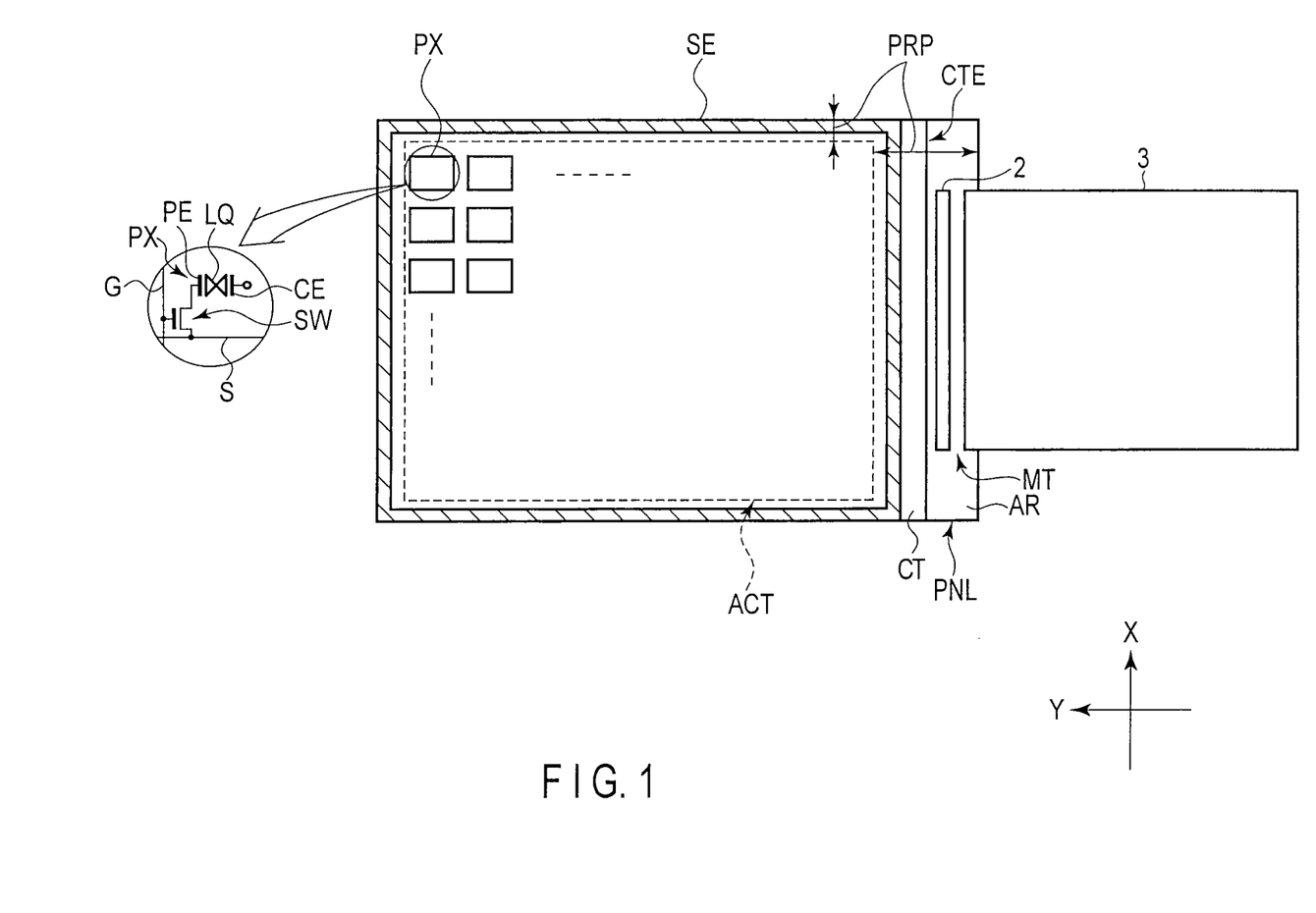
FIG. 1 is a schematic view, showing the structure of a display panel PNL incorporated in a liquid crystal display device according to a first embodiment, and showing an equivalent circuit incorporated in the panel.

FIG. 1 schematically shows the structure of a display panel PNL incorporated in a liquid crystal display device according to a first embodiment, and shows the equivalent circuit of part of the panel.

Namely, the display panel PNL is a transmissive liquid crystal display panel of active matrix type, and comprises an array substrate AR, a counter substrate CT opposing the array substrate AR, and a liquid crystal layer LQ. The array substrate AR and the counter substrate CT are attached to each other by a seal member SE, with a predetermined cell gap defined therebetween. In the shown example, the seal member SE is formed to a rectangular frame shape. The cell gap is defined by columnar spacers (not shown) provided between the array substrate AR and the counter substrate CT. The liquid crystal layer LQ is held in the cell gap between the array substrate AR and the counter substrate CT, by means of the seal member SE. The display panel PNL comprises an active area ACT for displaying images, which is provided within the space enclosed by the seal member SE. The active area ACT is, for example, substantially rectangular, and is formed of a plurality of color pixels PX arranged in a matrix.

In the active area ACT, the array substrate AR comprises gate lines G extending along a first axis X, source lines S extending along a second axis Y perpendicular to the first axis X, switching elements SW each electrically connected to corresponding gate line G and source line S in a corresponding color pixel PX, pixel electrodes PE connected to the switching elements SW in the respective color pixels PX, etc. Further, a common electrode CE of a common potential is incorporated in the array substrate AR or the counter substrate CT, and is opposed to the plurality of pixel electrodes PE, with the liquid crystal layer LQ interposed therebetween.

The display panel PNL will not be described in detail. In a mode mainly utilizing a longitudinal electric field, such as a twisted nematic (TN) mode, an optically compensated bend (OCB) mode, or a vertical aligned (VA) mode, the pixel electrodes PE are provided on the array substrate AR, and the common electrode CE is provided on the counter substrate CT. In contrast, in a mode mainly utilizing a transverse electric field, such as an in-plane switching (IPS) mode or a fringe field switching (FFS) mode, both the pixel electrodes PE and the common electrode CE are provided on the array substrate AR.

Signal sources, such as a drive IC chip 2 and a flexible printed circuit (FPC) board 3, needed for driving the display panel PNL are positioned in a peripheral area PRP outside the active area ACT. In the shown example, the drive IC chip 2 and the FPC board 3 are mounted on the mount portion MT of the array substrate AR which is further outwardly extended than the substrate end CTE of the counter substrate CT. The peripheral area PRP is an area enclosing the active area ACT, and is formed rectangular to include an area in which the seal member SE is provided.

Figure 2:
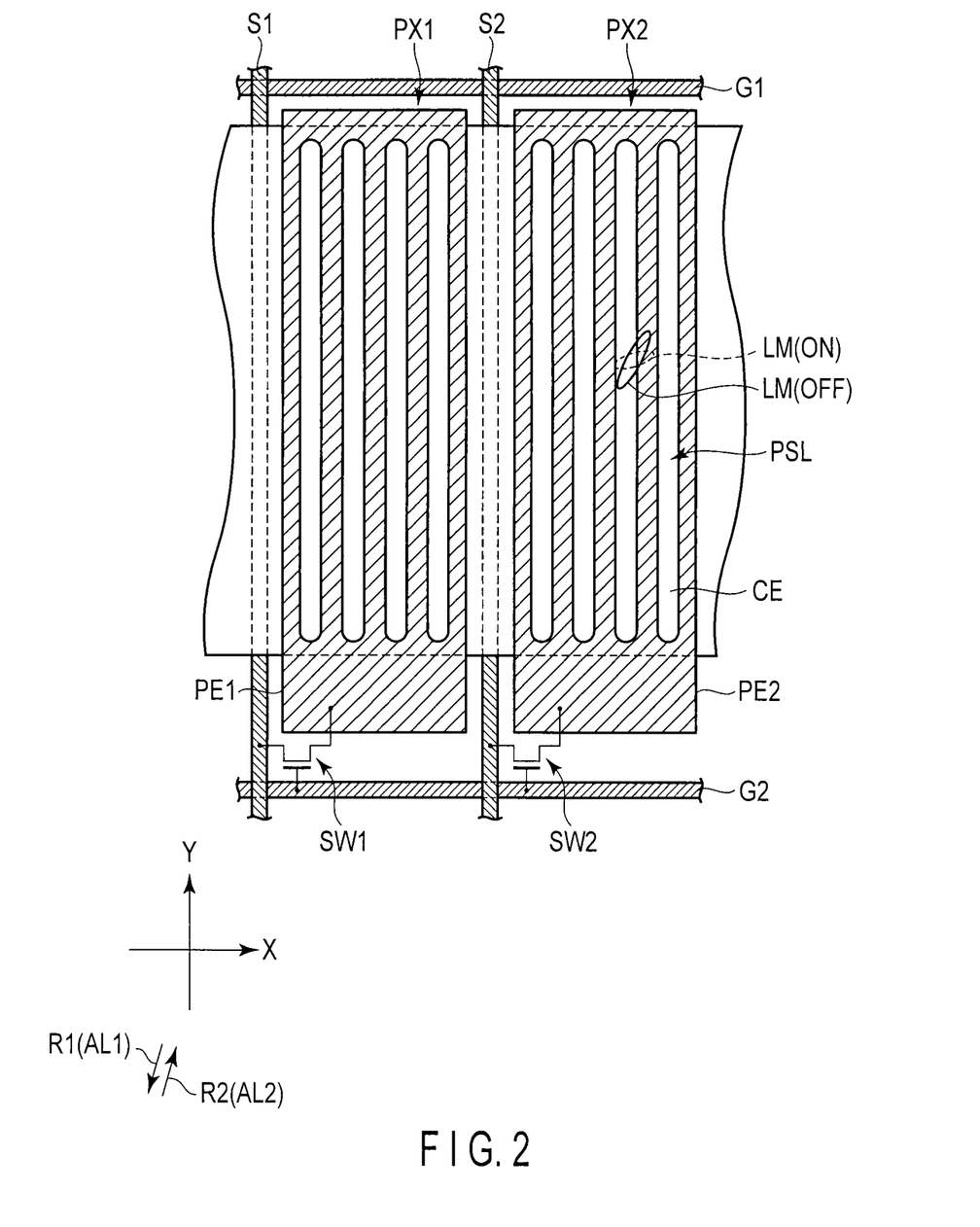
FIG. 2 is a schematic plan view, showing a pixel structure in the array substrate AR of FIG. 1 viewed from the counter substrate CT side.

FIG. 2 is a schematic plan view, showing a pixel structure in the array substrate AR of FIG. 1 viewed from the counter substrate CT side. More specifically, FIG. 2 shows a pixel structure example, to which the FFS mode utilizing the transverse electric field is applied, and only shows an essential part needed for the description. For instance, color pixels PX1 and PX2 arranged along the first axis X are pixels of different colors.

Gate lines G1 and G2 extend along the first axis X. Source lines S1 and S2 extend along the second axis Y and intersect with the gate lines G1 and G2. The color pixels PX1 and PX2 are formed substantially rectangular such that the length of each color pixel extending along the first axis X is shorter than that extending along the second axis Y. The color pixel PX2 is adjacent to the color pixel PX1 along the first axis X.

The common electrode CE extends along the first axis to cover the color pixels PX1 and PX2, and to cross over the source lines S1 and S2 and cover in common a plurality of color pixels PX adjacent along the first axis X. Further, the common electrode CE may be formed to cover in common a plurality of color pixels PX adjacent along the second axis Y, although not shown.

The color pixel PX1 comprises a switching element SW1, and a pixel electrode PE1 connected to the switching element SW1. The switching element SW1 is located near the intersection of the gate line G2 and the source line S1, and is electrically connected to the gate line G2 and the source line S1. The color pixel PX2 comprises a switching element SW2, and a pixel electrode PE2 connected to the switching element SW2. The switching element SW2 is located near the intersection of the gate line G2 and the source line S2, and is electrically connected to the gate line G2 and the source line S2. The switching elements SW1 and SW2 are formed of, for example, thin film transistors (TFTs).

The pixel electrodes PE1 and PE2 are located above the common electrode CE, and are formed like islands corresponding to the rectangular pixels. In the shown example, the pixel electrodes PE1 and PE2 are formed substantially rectangular such that the length of each pixel electrode extending along the first axis X is shorter than that extending along the second axis Y. The pixel electrodes PE1 and PE2 each have a plurality of slits PSL opposing the common electrode CE. In the shown example, the slits PSL extend along the second axis Y.

Figure 3:
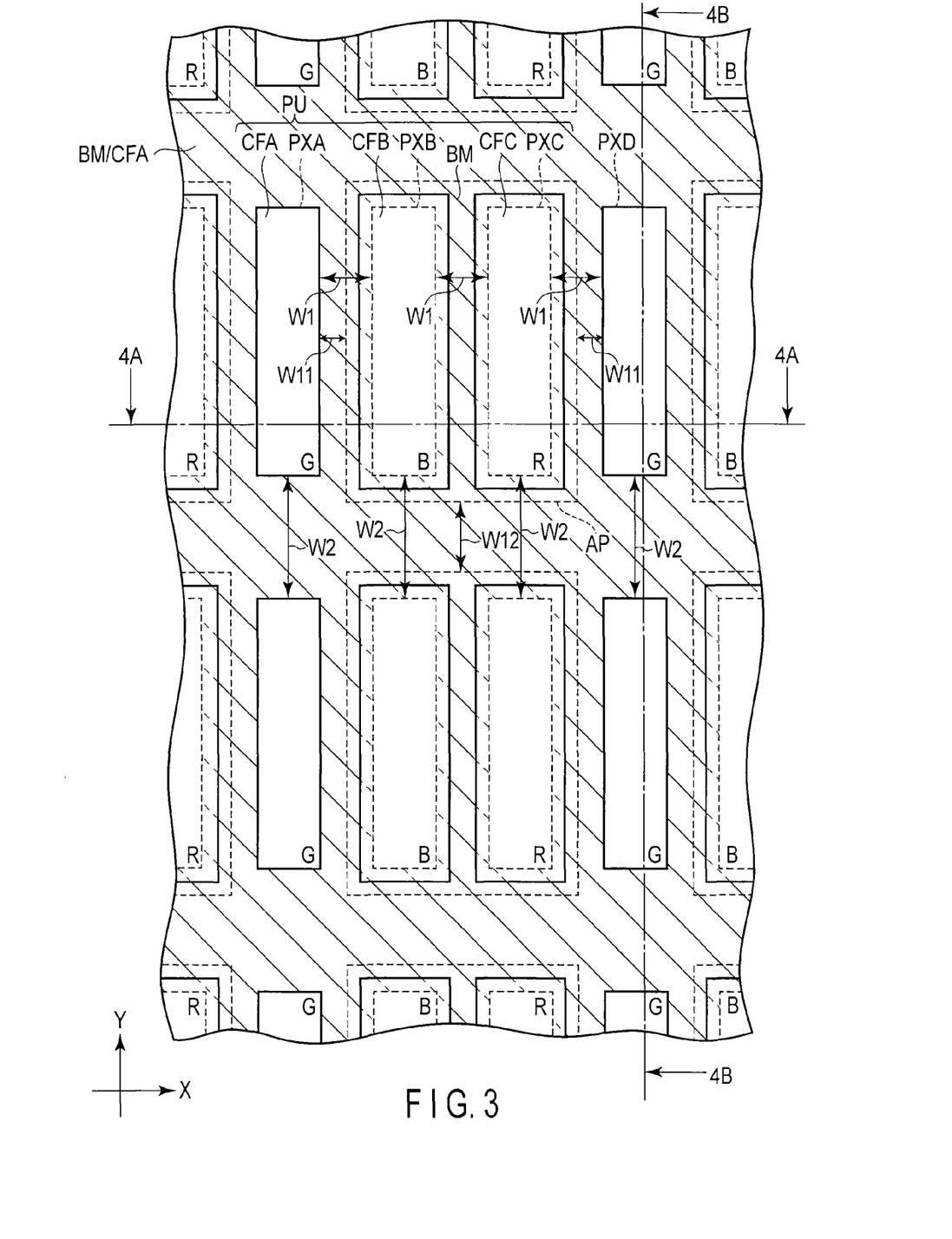
FIG. 3 is a schematic plan view, showing a layout example of color pixels, color filters and a light shielding layer employed in the first embodiment.

FIG. 3 is a schematic plan view showing a layout example of color pixels, color filters and a light shielding layer employed in the first embodiment. In the shown example, the first axis X is perpendicular to the second axis Y.

In the figure, a first color pixel PXA, a second color pixel PXB, a third color pixel PXC and a fourth color pixel PXD are arranged in this order along the first axis X. The first to fourth color pixels PXA to PXD are formed rectangular to extend along the second axis Y and have the same size, as was described with reference to FIG. 2. In the shown example, the first to third color pixels PXA to PXC are pixels displaying different colors, and cooperate to form a pixel unit PU as an example. The pixel unit PU means a minimum unit that provides a color image displayed in the active area. The color pixels arranged adjacent along the second axis Y are pixels of, for example, the same color.

A black matrix layer BM is provided to enclose each color pixel. The black matrix layer BM extends along the first axis X and the second axis Y. The black matrix layer BM is provided above the source lines S and the gate lines G shown in, for example, FIG. 2, and is formed like a grid. The first color pixel PXA to the fourth color pixel PXD are partitioned by the black matrix layer BM. Namely, the first color pixel PXA to the fourth color pixel PXD are located inside the black matrix layer BM, and correspond to an area (transparent area) through which backlight is substantially transmissive. In other words, the black matrix layer BM includes portions extending along the second axis Y between the first and second color pixels PXA and PXB, between the second and third color pixels PXB and PXC, and between the third and fourth color pixels PXC and PXD. The black matrix layer BM also includes portions extending along the first axis X between the color pixels adjacent along the second axis Y. The portions of the black matrix layer BM extending along the first axis X have a width W1 wider than the width W2 of the portions extending along the second axis Y.

A first color filter CFA is provided at the first and second color pixels PXA and PXD, and includes portions extending along the second axis Y between each pair of adjacent color pixels arranged along the first axis X, and portions extending along the first axis X between each pair of adjacent color pixels arranged along the second axis Y. In the shown example, the first color filter CFA also includes portions extending along the second axis Y between the first and second color pixels PXA and PXB and between the third and fourth color pixels PXC and PXD. In the first color filter CFA, the width W11 of the portions extending along the first axis X is narrower than the width W12 of the portions extending along the second axis Y. The first color filter CFA has an aperture AP in an area including the second and third color pixels PXB and PXC. No first color filter CFA is provided between the second and third color pixels PXB and PXC.

A second color filter CFB is provided at the second color pixel PXB in an aperture AP. More specifically, the second color filter CFB not only extends over the second color pixel PXB indicated by a broken line, but also extends to the outside of the second color pixel PXB around the periphery of the same. The second color pixel PXB is formed rectangular such that the length thereof extending along the first axis X is shorter than that extending along the second axis Y.

A third color filter CFC is provided at the third color pixel PXC in the aperture AP. More specifically, the third color filter CFC not only extends over the third color pixel PXC indicated by a broken line, but also extends to the outside of the third color pixel PXC around the periphery of the same. The third color pixel PXC is formed rectangular such that the length thereof extending along the first axis X is shorter than that extending along the second axis Y.

Figure 4A:
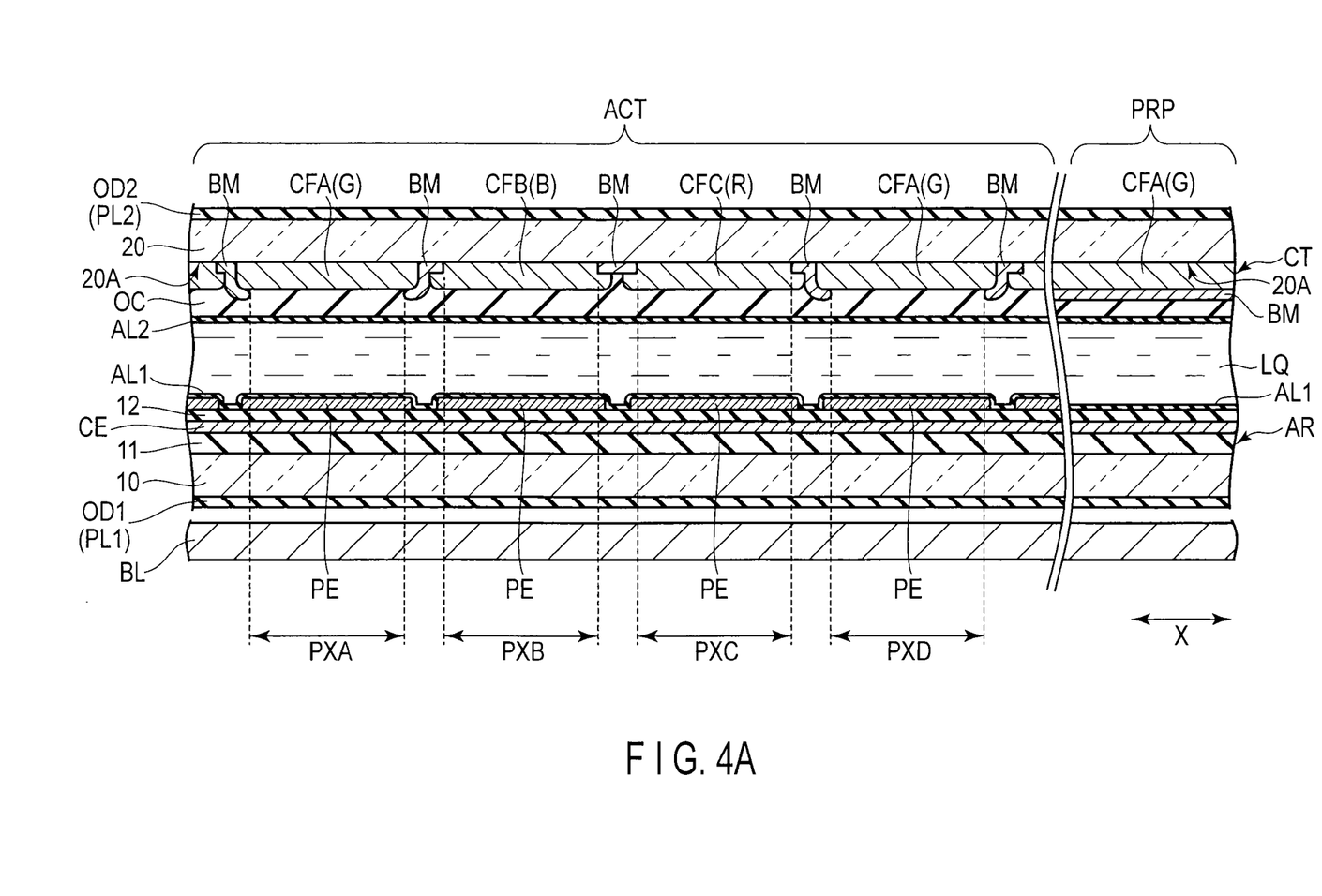
FIG. 4A is a schematic cross-sectional view, taken along line 4A-4A of FIG. 3, and showing the structure of a display panel PNL of an FFS mode to which the layout shown in FIG. 3 is applied.

A portion of the black matrix layer BM extending along the first axis X overlaps with the first color filter CFA except for the aperture AP. Namely, as shown in FIG. 4A, the portion of the black matrix layer BM extending along the first axis X is stacked on a surface (first surface) of the first color filter CFA close to the array substrate AR, except for the aperture AP. A portion of the black matrix layer BM extending along the second axis Y overlaps with the first surface of the first color filter CFA except for the aperture AP between the first and second color pixels PXA and PXB and between the third and fourth color pixels PXC and PXD. Similarly, surfaces of the second and third color filters close to the array substrate AR are also referred to as first surfaces. Further, surfaces of the first to third color filters opposite to the first surfaces are referred to as second surfaces. Although in the embodiment, gaps are formed between respective pairs of adjacent ones of the first to third color filters CFA to CFC, the end portions of the respective adjacent ones of the first to third color filters CFA to CFC may overlap with each other at positions at which the color filters overlap with the black matrix layer BM.

The first to third color filters CFA to CFC are filters of different colors selected from green, blue and red. For instance, the first color filter CFA is a green (G) filter. The second color filter CFB is a blue (B) filter. The third color filter CFC is a red (R) filter.

Although the above-described black matrix layer BM is superposed on the first color filter CFA, it may be superposed on the second color filter CFB or the third color filter CFC, instead.

Figure 4B:
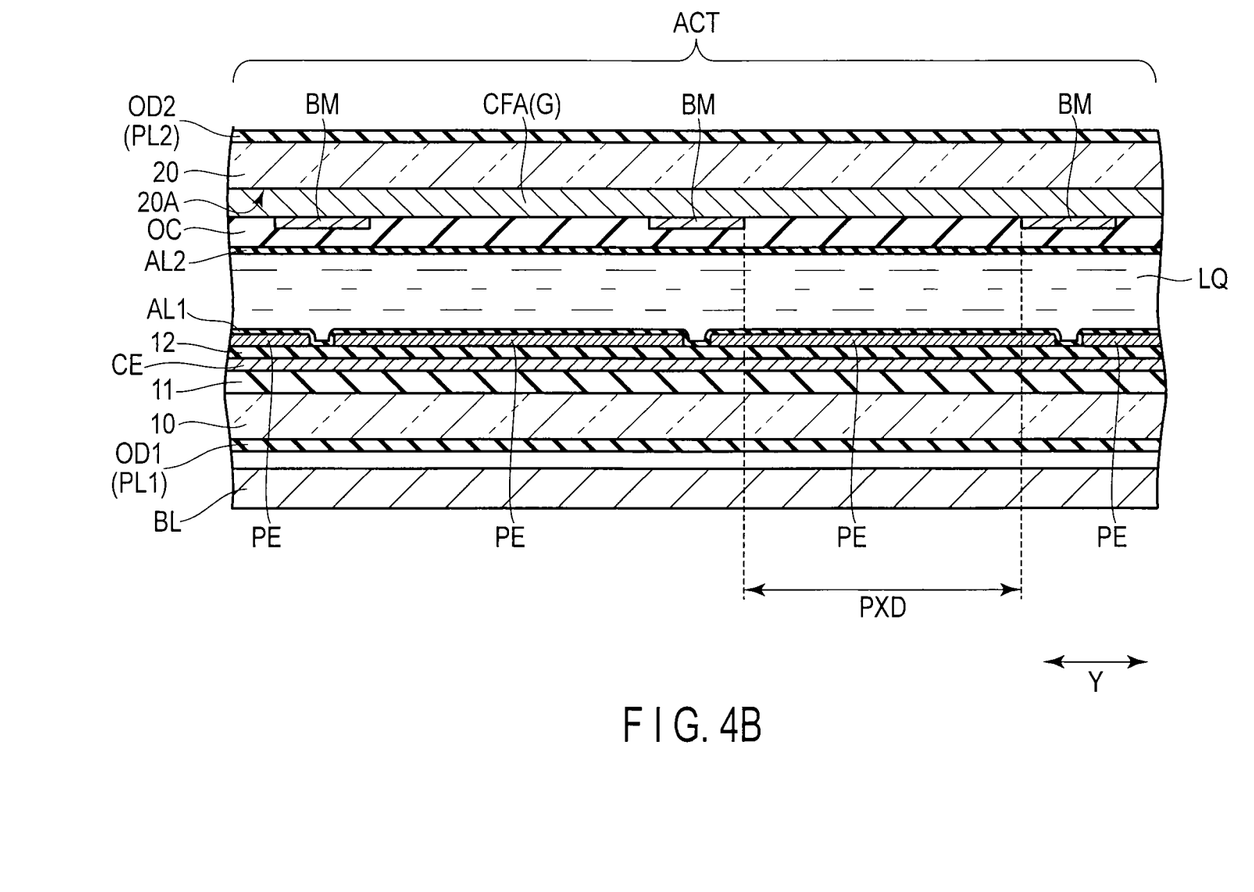
FIG. 4B is a schematic cross-sectional view, taken along line 4B-4B of FIG. 3, and showing the structure of the display panel PNL of an FFS mode to which the layout shown in FIG. 3 is applied.

FIG. 4A is a schematic cross-sectional view, taken along line 4A-4A of FIG. 3, and showing the structure of a display panel PNL of an FFS mode to which the layout shown in FIG. 3 is applied. FIG. 4B is a schematic cross-sectional view, taken along line 4B-4B of FIG. 3, and showing the structure of the display panel PNL of an FFS mode, to which the layout shown in FIG. 3 is applied.

The array substrate AR is formed using a transparent first insulating substrate 10 made of, for example, glass. The array substrate AR comprises switching elements (not shown), the common electrode CE, the pixel electrodes PE, etc. on a side of the first insulating substrate 10 opposing the counter substrate CT.

The common electrode CE is formed on a first insulating film 11. The common electrode CE is made of a transparent conductive material, such as indium tin oxide (ITO) or indium zinc oxide (IZO). The common electrode CE is covered with a second insulating film 12.

The pixel electrodes PE are formed on the second insulating film 12 and opposed to the common electrode CE. Although each pixel electrode PE has slits formed therein as mentioned above, it is not shown in detail. The pixel electrodes PE are made of, for example, ITO or IZO. The pixel electrodes PE are covered with a first orientation film AL1. The first orientation film AL1 also covers the second insulating film 12. The first orientation film AL1 is made of a material exhibiting horizontal orientation, and is provided on a surface of the array substrate AR contacting the liquid crystal layer LQ.

The counter substrate CT is formed by a transparent second insulating substrate 20 made of, for example, glass. The counter substrate CT comprises the black matrix layer BM, the first color filter CFA, the second color filters CFB, the third color filters CFC, an overcoat layer OC, etc., on a side of the second insulating substrate 20 opposing the array substrate AR.

The black matrix layer BM is formed of a black resin or a light shielding metal. The first color filter CFA is formed of a resin colored in green. The second color filters CFB are formed of a resin colored in blue. The third color filters CFC are formed of a resin colored in red.

The first color filter CFA is provided on the inner surface 20A of the second insulating substrate 20 in the first and fourth color pixels PXA and PXD of the active area ACT, and on the inner surface 20A (third surface) in the peripheral area PRP. The second color filters CFB are provided on the inner surface 20A in the second color pixels PXB. The third color filters CFC are provided on the inner surface 20A in the third color pixels PXC. More specifically, as shown in FIG. 4A, the second surfaces of the first to third color filters are formed substantially parallel to the third surface and attached thereto.

The black matrix layer BM is provided on the inner surface 20A between the first and second color pixels PXA and PXB and between the third and fourth color pixels PXC and PXD, and has portions overlapping with portions of the first color filter CFA opposing the array substrate. The black matrix layer BM is also provided on the inner surface 20A between the second and third color pixels PXB and PXC. End portions of the second and third color pixels PXB and PXC overlap with portions of the black matrix layer BM opposing the array substrate. In a peripheral area PRP, portions of the black matrix layer BM overlap with portions of the first color filter CFA opposing the array substrate.

The overcoat layer OC covers the first to third color filters CFA to CFC and the black matrix layer BM. The overcoat layer OC flattens the uneven surfaces of the first to third color pixels PXA to PXC and the black matrix layer BM. The overcoat layer OC is made of a transparent resin, and is covered with a second orientation film AL2. The second orientation film AL2 is made of a material exhibiting horizontal orientation, and is provided on a surface of the counter substrate CT contacting the liquid crystal layer LQ.

The counter substrate CT constructed as the above is produced by, for example, the following process: Namely, firstly, the first color filter CFA is formed on the second insulating substrate 20, then the black matrix layer BM is formed on the resultant structure, then the second and third color pixels PXB and PXC are formed on the resultant structure, and then the overcoat layer OC and the second orientation film AL2 are formed on the resultant structure to thereby form the counter substrate CT.

The above-described array substrate AR and the counter substrate CT are arranged such that the first and second orientation films AL1 and AL2 oppose each other. At this time, a predetermined cell gap is defined between the array substrate AR and the counter substrate CT, using spacers (not shown). The array substrate AR and the counter substrate CT are attached to each other by means of a seal member, with the cell gap interposed therebetween. The liquid crystal layer LQ is formed of a liquid crystal composition containing liquid crystal molecules LM sealed in the cell gap between the first orientation film AL1 of the array substrate AR and the second orientation film AL2 of the counter substrate CT.

A backlight BL is provided on the backside of the display panel PNL constructed as the above. Since various types of backlights can be used as the backlight BL, no detailed description is given of the structure of the backlight BL.

A first optical element OD1 including a first polarizing plate PL1 is provided on the outer surface of the array substrate AR, i.e., the outer surface of the first insulating substrate 10. A second optical element OD2 including a second polarizing plate PL2 is provided on the outer surface of the counter substrate CT, i.e., the outer surface of the second insulating substrate 20.

The hue of the light reflected from the display panel was measured, which was obtained when reference light was applied to the counter substrate of the display panel in the off state where no images were displayed in the active area (or in a state where the backlight was off). In this case, the display panel of the first embodiment and a display panel as a comparative example were prepared, and their respective reflected-light hues were measured. The display panel as the comparative example differs from the display panel of the first embodiment in that in the former, the entire black matrix layer is formed on the inner surface of the second insulating substrate.

Figure 5:
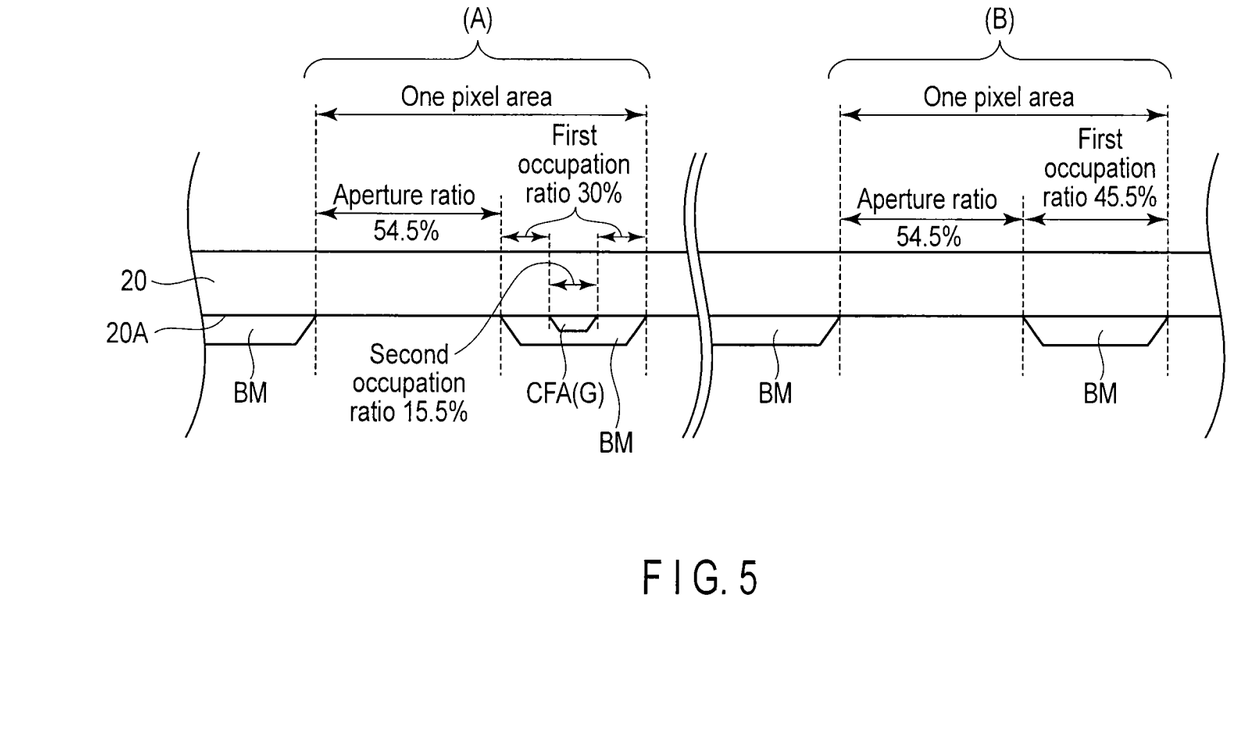
FIG. 5 is a schematic cross-sectional view for explaining an aperture ratio, a first occupation ratio and a second occupation ratio as measurement conditions.

FIG. 5 is a schematic cross-sectional view for explaining an aperture ratio, a first occupation ratio and a second occupation ratio as measurement conditions.

(A) in FIG. 5 is associated with the first embodiment, and (B) in FIG. 5 is associated with the comparative example. Assuming that one pixel area including the installation area of the black matrix layer BM is 100%, a light-transmitting area within the black matrix layer BM corresponds to the aperture ratio, the area of the black matrix layer BM contacting the inner surface 20A (third surface) of the second insulating substrate 20 corresponds to the first occupation ratio, and the area where the black matrix layer BM is stacked on the first color filter CFA corresponds to the second occupation ratio.

In the first embodiment, the aperture ratio is 54.5%, the first occupation ratio is 30%, and the second occupation ratio is 15.5%. In the comparative example, the aperture ratio is 54.5%, the first occupation ratio is 45.5%, and the second occupation ratio is 0%.

Figure 6:
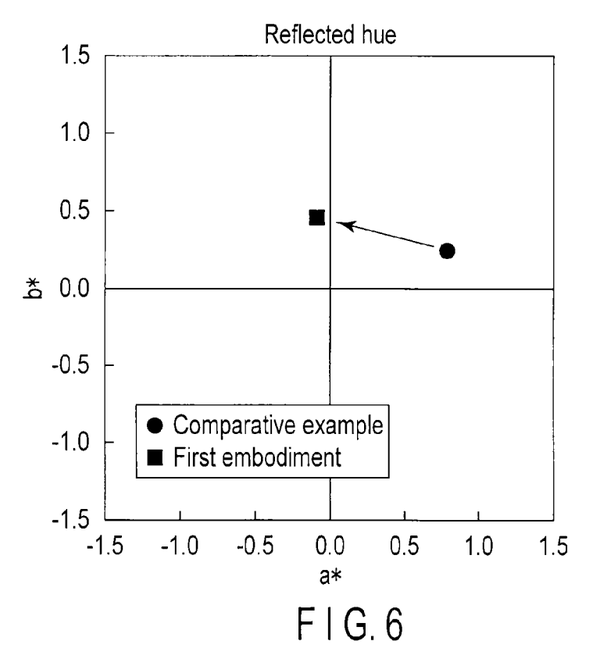
FIG. 6 is a graph showing an example of a reflected hue on a display panel according to a first embodiment and that of a comparative display panel.

FIG. 6 is a graph showing examples of reflected hues in the first embodiment and the comparative example.

FIG. 6 is the L*a*b color coordinate system where the minus side of the horizontal axis (a*) indicates green, the plus side of the horizontal axis (a*) indicates red. Further, the minus side of the vertical axis (b*) indicates blue, the plus side of the vertical axis (b*) indicates yellow.

In FIG. 6, mark "■" represents a reflected hue on the display panel of the first embodiment, and mark "●" represents a reflected hue on the comparative display panel. In the comparative example, a greater part of external light incident on the display panel is reflected by the black matrix layer BM (strictly speaking, the light is reflected near the interface between the second insulating substrate and the black matrix layer). Namely, it is confirmed that in a reflected hue on the comparative display panel, the contribution degree of the color of the light reflected from the black matrix layer BM is high, whereby red is dominant. In contrast, in the embodiment, the light entering the display panel is reflected by the black matrix layer BM and the first color (green) filter CFA. Namely, in the display panel of the first embodiment, the reflected light includes the light directly reflected by the black matrix layer BM contacting the inner surface of the second insulating substrate, and the light that is passed through the first color filter CFA contacting the inner surface of the second insulating substrate, then reflected by the black matrix layer BM stacked on the first color filter CFA, and again passed through the first color filter CFA. Thus, it is confirmed that the reflected hue on the display panel of the first embodiment exhibits a lower contribution degree of the color of the light reflected from the black matrix layer BM, than in the comparative example, and includes contribution of the color of the light reflected from the first color (green) filter CFA. Namely, it is confirmed that in the first embodiment, the degree of red is reduced, compared to the comparative example, and the reflected hue shifts to the green side.

As described above, in the first embodiment, since part of the black matrix layer BM extending along the first and second axes to partition the color pixels is stacked on a color filter, the reflected light of the external light entering the display panel when the display panel is in the off state (where no images are displayed) includes the light directly reflected from the black matrix layer, and the light reflected from the black matrix layer after passing through the color filter. Thus, in the embodiment, the reflected hue on the display panel is controlled without any design change of, for example, changing the optical density (OD value) of the black matrix layer, or changing the line pitch of the black matrix layer in order to overcome the coloring of the light reflected from the black matrix layer. The reflected hue can be controlled based on the color of the color filter with which the black matrix layer is stacked, the aperture ratio and the first and second occupation ratios.

For instance, when the light reflected from the black matrix layer is reddish, if reflected light passing through a green filter is added, the reflected hue on the display panel can be shifted to a neutral side (achromatic side). Thus, undesired coloring on the display panel when the display panel is in the off state can be suppressed to weaken the reflected hue on the panel.

Further, although the black matrix layer has a length longer along the first axis than along the second axis, the greater part of the portion along the first axis is stacked on the first color filter, which reduces the ratio of the light directly reflected from the black matrix layer, thereby improving the reflected hue. In particular, if the ratio of the light directly reflected from the black matrix layer is high and causes degradation of the reflected hue, the reflected hue can be weakened by causing a wide portion and/or a wide installation portion of the black matrix layer to overlap with the first color filter. For instance, it is desirable that the black matrix layer is provided above an interconnect having a greater width.

Further, although the black matrix layer is extended to the peripheral area PRP, the greater part of this extension is stacked on the first color filter, and hence the reflected hue in the peripheral area PRP is also weakened. However, in the peripheral area PRP, it is not always necessary to stack the entire black matrix layer on the first color filter. Namely, depending upon the hue of the light reflected from the black matrix layer, the black matrix layer may be stacked on a plurality of color filters of different colors, or part of the black matrix layer be directly formed on the inner surface of the second insulating substrate without any color filters interposed therebetween.

Other layout examples will now be described.

Figure 7:
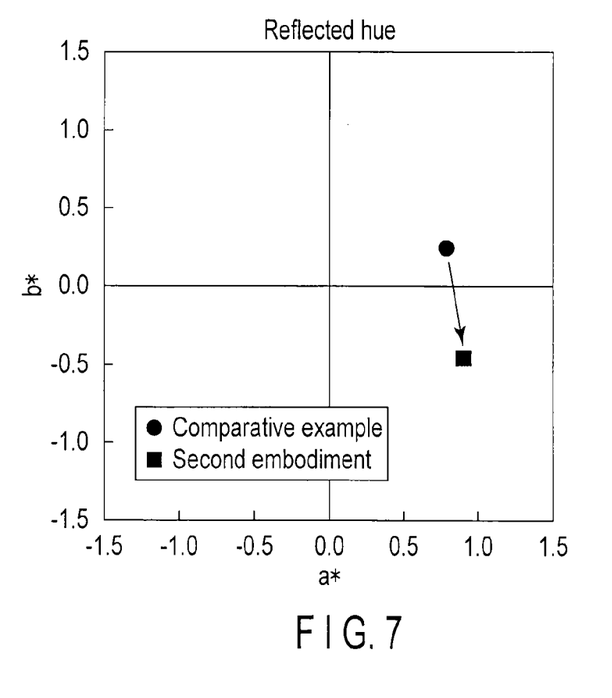
FIG. 7 is a graph showing an example of a reflected hue on a display panel according to a second embodiment.

FIG. 7 is an example of a graph, showing the reflected hue on a display panel according to a second embodiment.

The second embodiment differs from the first embodiment in the color of the first color filter CFA. More specifically, the first color filter CFA is a blue color filter, and the second color filter CFB is a green filter. The other elements are similar to those of the first embodiment, and hence will not be described in detail.

In the second embodiment, the aperture ratio is 54.5%, the first occupation ratio is 30.0%, and the second occupation ratio is 15.5%.

In FIG. 7, mark "■" represents a reflected hue on the display panel of the second embodiment, and mark "●" represents a reflected hue on the comparative display panel. In the second embodiment, external light entering the display panel is reflected by the black matrix layer BM and the first color (blue) filter CFA. Namely, the reflected light on the display panel of the second embodiment includes the light directly reflected by the black matrix layer BM contacting the inner surface of the second insulating substrate, and the light that is passed through the first color (blue) filter CFA contacting the inner surface of the second insulating substrate, then reflected by the black matrix layer BM stacked on the first color filter CFA, and again passed through the first color filter CFA. Thus, it is confirmed that the reflected hue on the display panel of the second embodiment exhibits a lower contribution degree of the color of the light reflected from the black matrix layer BM, than in the comparative example, and includes contribution of the color of the light reflected from the first color (blue) filter CFA. Namely, it is confirmed that in the second embodiment, the degree of red is reduced, compared to the comparative example, and the reflected hue shifts to the blue side.

As described above, the second embodiment can provide the same advantage as the first embodiment.

Yet another layout example will be described.

Figure 8:
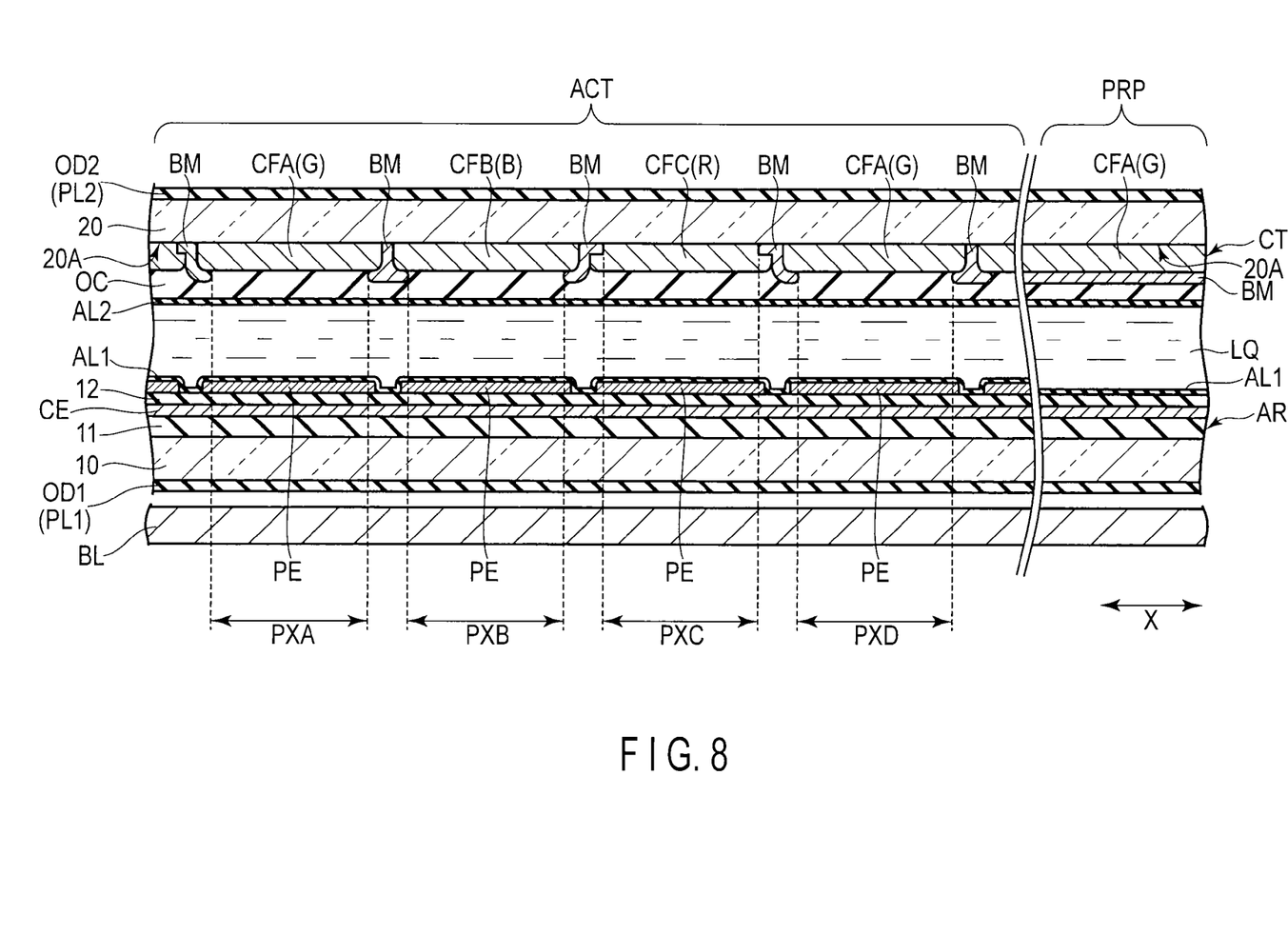
FIG. 8 is a schematic cross-sectional view, showing the structure of a display panel PNL of an FFS mode, to which a layout according to a third embodiment is applied.

FIG. 8 is a schematic cross-sectional view, showing the structure of a display panel PNL of an FFS mode, to which a layout according to a third embodiment is applied.

The third embodiment differs from the first and second embodiments in that in the former, the black matrix layer BM is stacked on two color filters. More specifically, the first color filter CFA is a green filter, and the second color filter is a blue filter. The other elements are similar to those of the first embodiment shown in FIGS. 3 and 4, and therefore no description will be given thereof.

The black matrix layer BM is provided on the inner surface 20A between the first and second color pixels PXA and PXB, and has portions overlapping with end portions of the first and second color filters CFA and CFB opposing the array substrate. Namely, the black matrix layer BM is formed over the first and second color filters CFA and CFB. The black matrix layer BM is also provided on the inner surface 20A between the second and third color pixels PXB and PXC, and has a portion overlapping with an end portion of the second color filter CFB opposing the array substrate. The black matrix layer BM is further provided on the inner surface 20A between the third and fourth color pixels PXC and PXD, and has a portion overlapping with an end portion of the first color filter CFA opposing the array substrate. The opposite end portions of the third color filter CFC overlap with respective portions of the black matrix layer BM opposing the array substrate.

In the peripheral area PRP, the black matrix layer BM overlaps with a portion of the first color filter CFA opposing the array substrate.

The counter substrate CT constructed as the above is produced by, for example, the following process: Namely, on the second insulating substrate 20, the first color filter CFA is formed, then the second color filter CFB is formed, then the black matrix layer BM is formed, and then the third color filter CFC is formed. After that, the overcoat layer OC and the second orientation film AL2 are sequentially formed on the resultant structure, thereby providing the counter substrate CT.

Although the black matrix layer BM is formed on the first and second color filters, it may be formed on arbitrary selected two different color filters. The color of a color filter as an underlying layer of the black matrix layer BM is not limited to a particular one, but may be any color and may be replaced with another color.

Figure 9:
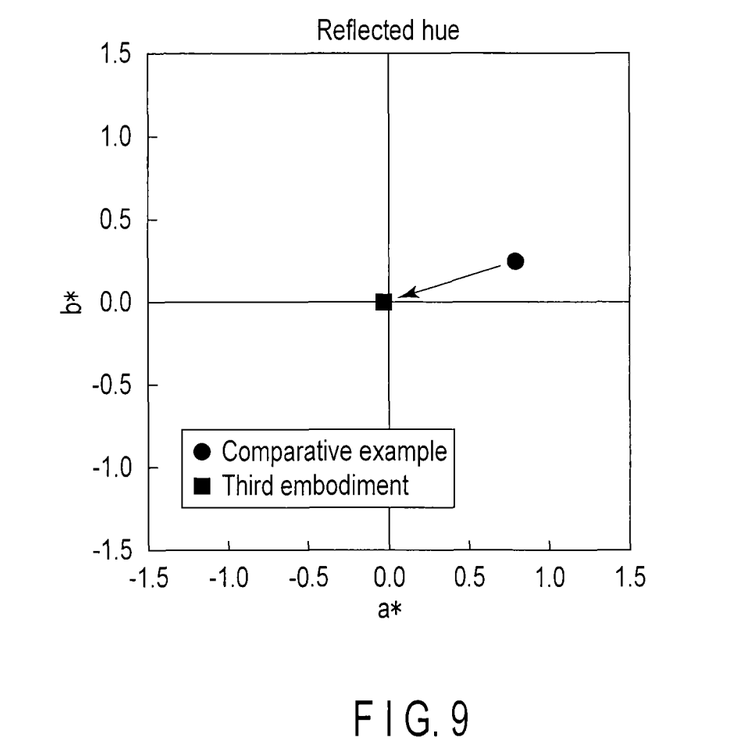
FIG. 9 is a graph showing an example of a reflected hue on the display panel according to the third embodiment.

FIG. 9 is a graph showing an example of a reflected hue on the display panel according to the third embodiment.

In the third embodiment, the aperture ratio is 54.5%, the first occupation ratio is 20.0%, and the second occupation ratio is 35.5%. The second occupation ratio includes a ratio of 15.5% with which the black matrix layer BM overlaps with the first color (green) filter, and a ratio of 10.0% with which the black matrix layer BM overlaps with the second color (blue) filter.

In FIG. 9, mark "■" represents a reflected hue on the display panel of the third embodiment, and mark "●" represents a reflected hue on the aforementioned comparative display panel. In the third embodiment, external light entering the display panel is reflected by the black matrix layer BM, the first color (green) filter CFA and the second color (blue) filter CFB. Namely, the reflected light on the display panel of the third embodiment includes the light directly reflected by the black matrix layer BM contacting the inner surface of the second insulating substrate, and the light that is passed through the first color (green) filter CFA and the second color (blue) filter CFB contacting the inner surface of the second insulating substrate, then reflected by the black matrix layer BM stacked on the first and second color filters CFA and CFB, and again passed through the first and second color filters CFA and CFB. Thus, it is confirmed that the reflected hue on the display panel of the third embodiment exhibits a lower contribution degree of the color of the light reflected from the black matrix layer BM, than in the comparative example, and includes contribution of the color of the light reflected from the first color (green) filter CFA and the second color (blue) filter CFB. Namely, it is confirmed that in the third embodiment, the degree of red is reduced, compared to the comparative example, and the reflected hue shifts to an achromatic side.

Consequently, the third embodiment can provide the same advantage as the first embodiment. Further, since in the third embodiment, the black matrix layer is stacked on color filters of different colors, the reflected hue can be more weakened than in the case where the black matrix layer is stacked on a single-color filter.

As described above, the third embodiment can provide a liquid crystal display device in which a reflected hue on its display panel is weakened when the display panel is in the off state where no images are displayed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including pixel electrodes corresponding to a first pixel, a second pixel, a third pixel and a fourth pixel arranged in an order mentioned along a first axis;

a second substrate including a first color filter, a second color filter, a third color filter, and a black matrix layer, the first color filter extending along the first axis and along a second axis perpendicular to the first axis, the first color filter located in an area corresponding to the first to fourth pixels, and having an aperture formed in an area including the second and third pixels, the second color filter located in the aperture in an area corresponding to the second pixel, the third color filter located in the aperture in an area corresponding to the third pixel, the black matrix layer extending along the first and second axes and partitioning the first to fourth pixels; and a liquid crystal layer held between the first and second substrates, wherein the black matrix layer includes portions extending on the first color filter along the first axis, and portions extending on the first color filter along the second axis between the first and second pixels and between the third and fourth pixels; and the first color filter is formed into a grid-like shape having the aperture.

2. The liquid crystal display device of claim 1, wherein the black matrix layer further includes portions extending on the second color filter along the second axis between the first and second pixels and between the second and third pixels.

3. The liquid crystal display device of claim 1, wherein the first color filter is a green or blue filter.

4. The liquid crystal display device of claim 1, wherein the portions of the black matrix layer extending along the first axis have a narrower width than the portions of the black matrix layer extending along the second axis.

5. The liquid crystal display device of claim 1, wherein the first substrate includes a common electrode opposing the pixel electrodes.

6. The liquid crystal display device of claim 1, wherein the first to third color filters have respective first surfaces close to the first substrate, and respective second surfaces opposite to the first surface; and the black matrix layer includes a portion stacked on the first surface of the first color filter, and portions contacting the second surfaces of the second and third color filters.

7. The liquid crystal display device of claim 6, wherein the portion of the black matrix layer stacked on the first surface is smaller than portions of the black matrix layer contacting a third surface parallel to the second surfaces.

8. The liquid crystal display device of claim 1, wherein the first to third color filters have respective first surfaces close to the first substrate, and respective second surfaces opposite to the first surface; and the black matrix layer includes portions stacked on the first surfaces of the first and second color filters, and a portion contacting the second surface of the third color filter.

9. The liquid crystal display device of claim 8, wherein the portions of the black matrix layer stacked on the first surface are larger than a portion of the black matrix layer contacting a third surface parallel to the second surface.

10. A liquid crystal display device comprising:
a first substrate including switching elements and pixel electrodes electrically connected to the switching elements;
a second substrate including an insulating substrate, a first color filter formed on a surface of the insulating substrate opposing the first substrate, a second color filter separate from the first color filter, a third color filter separate from the first and second color filters, and a black matrix layer stacked on at least one of the first to third color filters; and
a liquid crystal layer held between the first and second substrates,
wherein the first to third color filters have respective first surfaces close to the first substrate, and respective second surfaces opposite to the first surface; and
the black matrix layer includes a portion stacked on the first surface of the first color filter, and portions contacting the second surfaces of the second and third color filters.

11. The liquid crystal display device of claim 10, wherein the black matrix layer is stacked on the first or second color filter, the first color filter is a green filter, and the second color filter is a blue filter.

12. The liquid crystal display device of claim 10, wherein the first substrate includes a common electrode opposing the pixel electrodes.

13. The liquid crystal display device of claim 10, wherein the portion of the black matrix layer stacked on the first surface is smaller than portions of the black matrix layer contacting a third surface parallel to the second surfaces.

14. A liquid crystal display device comprising:
a first substrate including switching elements and pixel electrodes electrically connected to the switching elements;
a second substrate including an insulating substrate, a first color filter formed on a surface of the insulating substrate opposing the first substrate, a second color filter separate from the first color filter, a third color filter separate from the first and second color filters, and a black matrix layer stacked on at least one of the first to third color filters; and
a liquid crystal layer held between the first and second substrates,
wherein the first to third color filters have respective first surfaces close to the first substrate, and respective second surfaces opposite to the first surface; and
the black matrix layer includes portions stacked on the first surfaces of the first and second color filters, and a portion contacting the second surface of the third color filter.

15. The liquid crystal display device of claim 14, wherein the portions of the black matrix layer stacked on the first surface are larger than a portion of the black matrix layer contacting a third surface parallel to the second surface.

16. The liquid crystal display device of claim 1, wherein the first color filter overlaps with the black matrix layer, which has a grid-like shape, in an area except a boundary between the second pixel and the third pixel.

* * * * *